(12) United States Patent
Toya

(10) Patent No.: US 6,239,580 B1
(45) Date of Patent: May 29, 2001

(54) METHOD OF CONTROLLING CHARGING AND DISCHARGING

(75) Inventor: Shoichi Toya, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/449,481

(22) Filed: Nov. 29, 1999

(30) Foreign Application Priority Data

Dec. 1, 1998 (JP) .................................................. 10-341856

(51) Int. Cl.⁷ ...................................................... H02J 7/04
(52) U.S. Cl. ............................................. 320/149; 320/137
(58) Field of Search ..................................... 320/149, 137, 320/116, 118, 134

(56) References Cited

U.S. PATENT DOCUMENTS

| | | | |
|---|---|---|---|
| 5,545,969 | * | 8/1996 | Hasegawa .............................. 320/134 |
| 5,644,212 | | 7/1997 | Takahashi ............................. 320/134 |
| 6,054,840 | * | 4/2000 | Nakanishi et al. .................... 320/118 |

FOREIGN PATENT DOCUMENTS

| | | |
|---|---|---|
| 3832839 | 3/1990 | (DE) . |
| 19541959 | 5/1996 | (DE) . |
| 7-335266 | 12/1995 | (JP) . |

* cited by examiner

*Primary Examiner*—Peter S. Wong
*Assistant Examiner*—Lawrence Luk
(74) *Attorney, Agent, or Firm*—Wenderoth, Lind & Ponack, L.L.P.

(57) ABSTRACT

This method of controlling charging and discharging computes a capacity of a battery array formed from a plurality of series connected rechargeable batteries while charging and discharging the battery array. For each specified time period, charge-discharge capacity is computed and integrated during the specified time period. A first specified time period is followed by a second specified time period, and forced charging or forced discharge is performed during the second specified time period to make the sum of the charge-discharge capacity during the second specified time period plus the charge-discharge capacity during the first specified time period approach zero.

13 Claims, 5 Drawing Sheets

METHOD OF CONTROLLING CHARGING AND DISCHARGING

This application is based on application No. 10-341856 filed in Japan on Dec. 1, 1998, the content of which is incorporated hereinto by reference.

BACKGROUND OF THE INVENTION

This invention relates to a method of computing the capacity of a battery array, made up of a plurality of series connected rechargeable batteries, and controlling charging and discharging of that battery array.

A rechargeable battery capable of repeated charging and discharging is provided with a full charge detection circuit and an over-discharge protection circuit to prevent over-charging and over-discharge. As a means of detecting full charge, the voltage detection method which detects rechargeable battery voltage, the -DV method which detects a specified voltage drop from peak rechargeable battery voltage, the temperature detection method which detects rechargeable battery temperature, and other methods are known. On the other hand, methods such as rechargeable battery voltage detection are widely known for incorporation into an over-discharge protection circuit.

Incidentally, in the use of rechargeable batteries as power sources, a plurality of rechargeable batteries are often electrically connected together in series and parallel combinations for use as a battery array. In the case of a battery array, the capacity of each individual rechargeable battery and the performance of each rechargeable battery with charging and discharging show some variation, and all rechargeable batteries do not result in exactly the same state. Consequently, even though observation of the over-all battery array shows no indication of a problem, it is possible that one part of the rechargeable battery components has over-charged or over-discharged and the battery array as a whole has been degraded.

To solve this problem, Japanese Non-examined Patent Publication No. 7-335266 issued on Dec. 22, 1995 discloses the provision of bypass circuitry for each of a plurality of rechargeable batteries connected in series. However, for the case of a battery array used as a power source for an electric automobile, the number of rechargeable batteries connected in series is around two hundred, and circuit complexity becomes extreme.

Thus it is an object of the present invention to provide a method of controlling charging and discharging of a battery array via a simple configuration that prevents over-charging and over-discharge of each component rechargeable battery of the battery array.

The above and further objects and features of the invention will more fully be apparent from the following detailed description with accompanying drawings.

SUMMARY OF THE INVENTION

The method of controlling charging and discharging of the present invention controls charging and discharging of a battery array made up of a plurality of series connected rechargeable batteries while computing battery array capacity. The method of the present invention computes an integrated charge-discharge capacity during each period of a specified time interval. In addition, it performs forced charging or forced discharge of the battery array to make the sum of the integrated charge-discharge capacity during a second specified time interval plus that of a preceding first time interval approach zero.

In the charging and discharging of a battery array made up of a plurality of series connected rechargeable batteries, this method enables charging and discharging of the battery array while reliably preventing over-charging and over-discharge of all component rechargeable batteries regardless of capacity and performance variations of each component rechargeable battery.

Further, it is preferable to establish an upper capacity limit lower than the full charge capacity of the battery array, a lower capacity limit greater than the capacity at complete discharge, and a specified capacity in the range between the upper capacity limit and the lower capacity limit. When the computed capacity reaches the upper capacity limit or the lower capacity limit more than a specified number of times, or each time a specified time period has elapsed, battery array computed capacity is revised.

Preferably, in the method of controlling charging and discharging of the present invention, battery array computed capacity is revised by charging until the temperature or the rate of the temperature rise of at least one rechargeable battery becomes equal to or greater than a specified value, or battery voltage becomes equal to or greater than a specified voltage. At that point, a capacity tolerance limit lower than the full charge capacity but greater than the upper capacity limit is written into the battery array computed capacity.

It is also preferable in the method of controlling charging and discharging of the present invention to prohibit battery array charging after computed capacity revision until battery array computed capacity reaches the specified capacity.

DETAILED DESCRIPTION OF THE INVENTION

Figure 1:
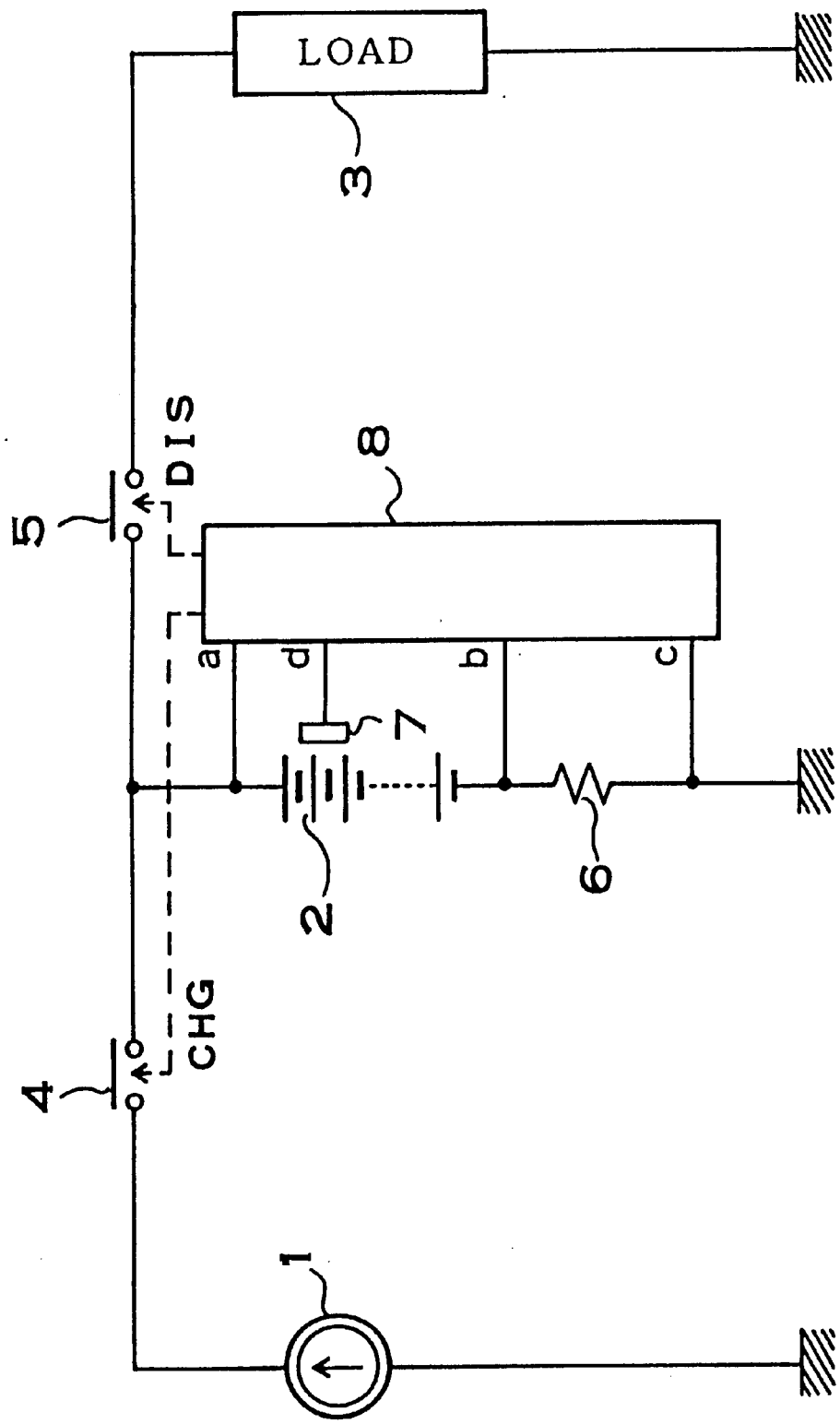
FIG. 1 is a block circuit diagram showing an embodiment of the present invention.

FIG. 1 shows an embodiment of the present invention. In FIG. 1, 1 is a battery charger, 2 is a battery array made up of a plurality of rechargeable batteries (for example, 200 nickel hydrogen batteries) electrically connected in series, 3 is a load driven by the rechargeable battery array 2, 4 is a charging switch between the charger 1 and the battery array 2, 5 is a discharge switch between the battery array 2 and the load 3, 6 is a battery array 2 charging current and discharge current resistor connected in series with the battery array 2, 7 is a temperature sensing element for detecting temperature of the battery array 2, and 8 is a control circuit for controlling the charging switch 4 and discharge switch 5 on and off based on battery array 2 capacity, battery voltage, and temperature, etc.

Battery temperature detection can be detection of the temperature of all rechargeable batteries or the temperature of designated blocks of the battery array.

Figure 2:
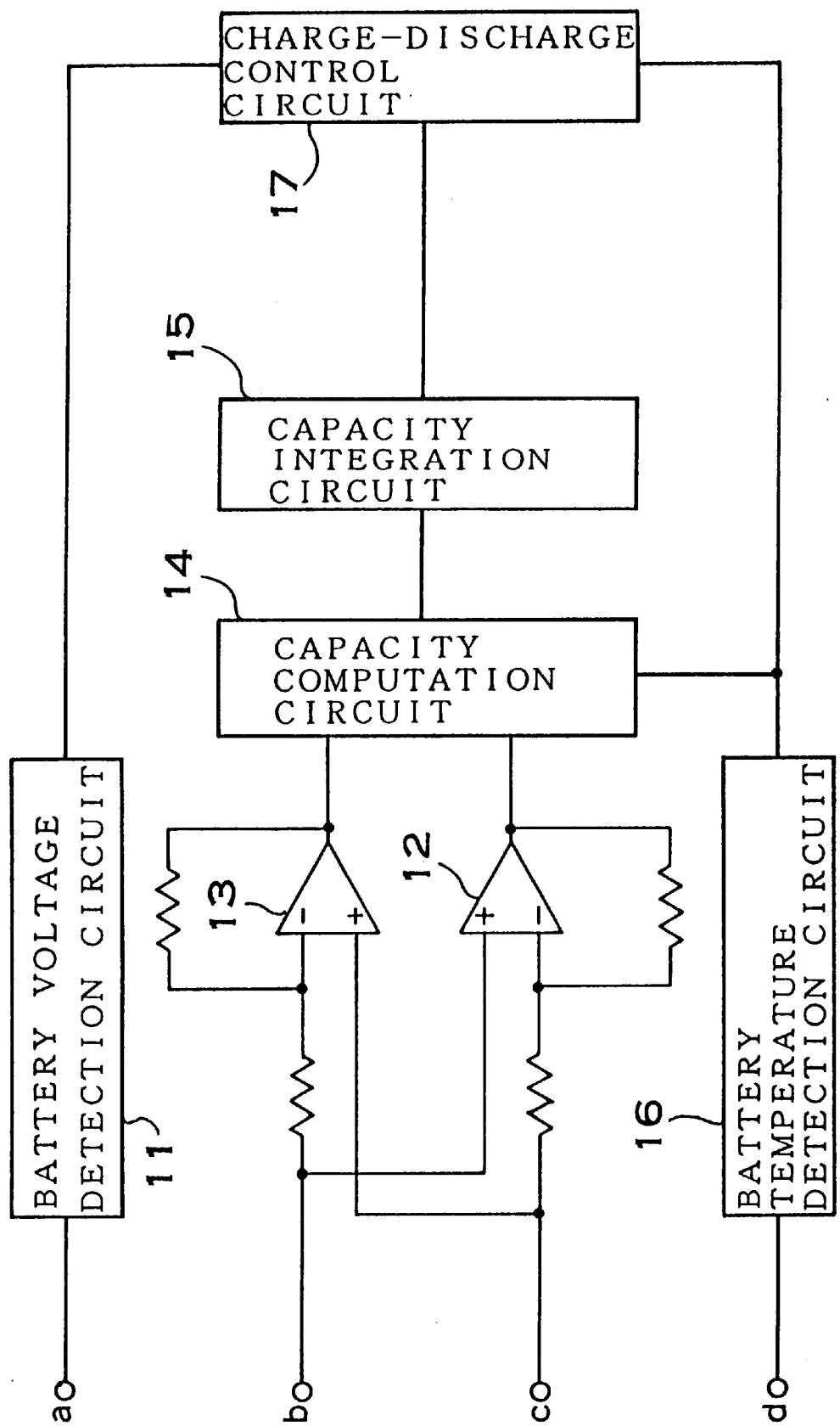
FIG. 2 is a block circuit diagram showing details of important parts of an embodiment of the present invention.

FIG. 2 shows the details of the control circuit 8. In FIG. 2, 11 is a battery voltage detection circuit for measuring the voltage of the battery array 2, and 12 and 13 are first and second amplifiers for amplifying voltage developed across the two terminals of the current detection resistor 6. When charging current flows through the battery array 2, a voltage proportional to the voltage across current detection resistor 6 is output by the first amplifier 12. On the contrary, when discharge current flows through the battery array 2, a voltage proportional to the voltage across current detection resistor 6 is output by the second amplifier 13.

In FIG. 2, 14 is a capacity computation circuit which multiplies the charging current and the discharge current, namely the output signal from the first amplifier 12 and the second amplifier 13, by a specified time to compute the charging capacity and the discharge capacity of the battery array 2. Further, 15 is a capacity integration circuit which integrates battery array 2 capacity based on computed results from the capacity computation circuit 14. The capacity integration circuit 15 successively adds computed battery array 2 capacity during charging, and subtracts computed battery array 2 capacity during discharge. Integration results from the capacity integration circuit 15 become the computed capacity of the battery array 2.

In FIG. 2, 16 is a battery temperature detection circuit which determines battery array 2 temperature via the signal from the temperature sensing element 7. Finally, 17 is a charge-discharge control circuit which controls the charging switch 4 and the discharge switch 5 on and off based on results from the capacity integration circuit 15, the battery voltage detection circuit 11, and the battery temperature detection circuit 16.

In the control circuit 8, it is preferable to implement the capacity computation circuit 14, the capacity integration circuit 15, and the charge-discharge control circuit 17 system as a micro-computer.

In the present invention, battery array 2 charging and discharging fundamentally takes place within a specified range defined by a lower capacity limit (for example, 45% of full charge capacity) and an upper capacity limit (for example, 55% of full charge capacity).

Figure 3:
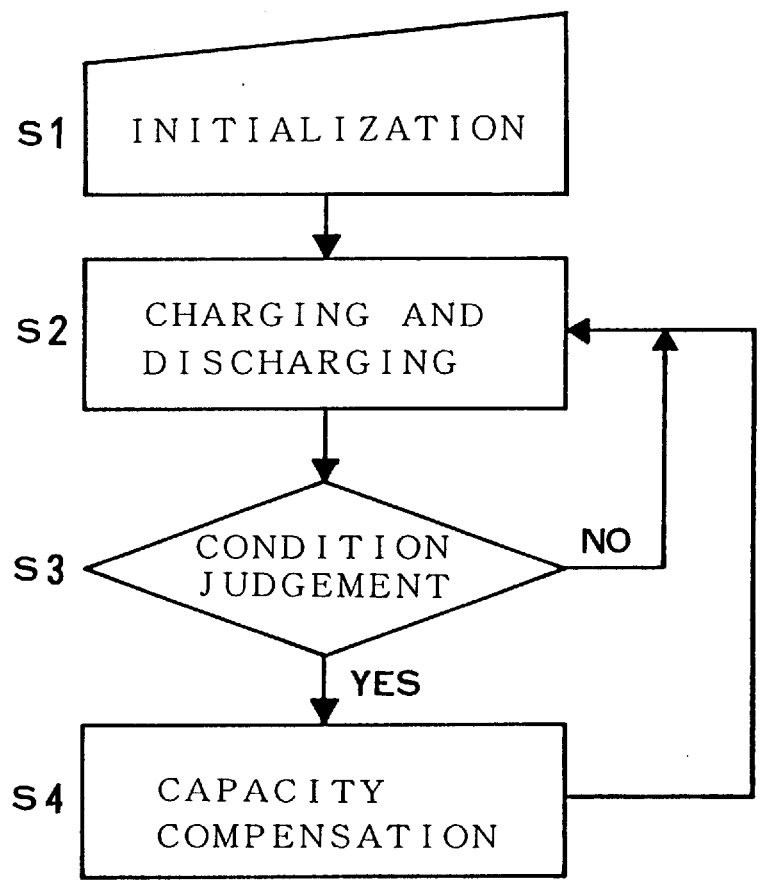
FIG. 3 is a flow-chart showing operation of an embodiment of the present invention.

The following more explicitly describes operation based on the flow-chart of FIG. 3. In the first step S1, initialization is performed. Here, the battery array 2 is charged to a specified capacity (for example, 50% of full charge capacity).

Figure 4:
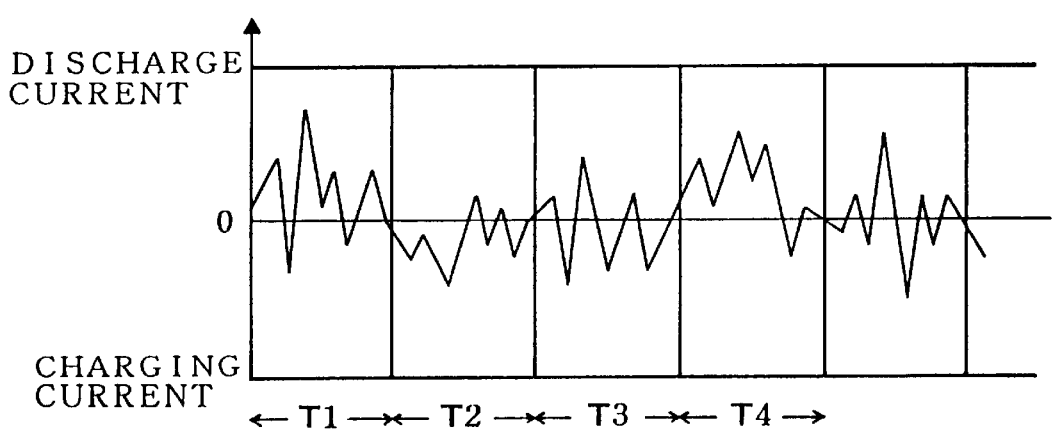
FIG. 4 is a graph of charge-discharge current showing operation of an embodiment of the present invention.

For the case where the battery array 2 is used to power an electric automobile, charging and discharging are repeatedly performed depending on automobile driving conditions, as shown in FIG. 4. In the second step S2, charge capacity and discharge capacity are computed by integrating charging current and discharge current in each specified time interval (T1, T2, T3, T4, . . with time period T) as shown in FIG. 4. A first specified time period is followed by a second specified time period. Forced charging or forced discharging is performed during the second specified time period to make the sum of the charge-discharge capacity integrated during the second specified time period plus the charge-discharge capacity integrated during the first specified time period approach zero.

To explain operation more specifically, assume discharge capacity is greater than charging capacity by an amount X during time interval T1. Over the entire time interval T2, forced charging is performed equivalent to a charge of the amount X. As a result, the amount of battery capacity consumed from the specified capacity of the battery array 2 in time interval T1 is replenished and the capacity of battery array 2 does not stray very far from the specified capacity. However, just as during time interval T1, charge-discharge capacity in addition to the amount of forced charging is integrated during time interval T2. As a result, assume the amount of charging capacity is greater than discharge capacity by an amount Y during time interval T2.

In this case, over the entire time interval T3, forced discharge is performed for a battery array capacity of the amount Y. As a result, battery array 2 capacity is diminished by an amount equivalent to that added beyond the specified capacity during T2, and again the capacity of battery array 2 does not stray very far from the specified capacity. However, again charge-discharge capacity is integrated as during time interval T2 with the amount of forced discharge also added.

In this manner, battery array 2 capacity transitions about the specified capacity as a center point during charging and discharging. However, there are also cases when the difference between charging capacity and discharge capacity over a specified time interval is so great it cannot be adjusted over the next specified interval by forced charging or forced discharge. In such a case, battery array 2 capacity strays significantly from the specified capacity and can reach or exceed the upper capacity limit or the lower capacity limit.

Further, as time progresses, a discrepancy between the computed capacity and the actual capacity of the battery array 2 develops, and it is necessary to revise the computed capacity. A judgment is made at the third step S3 whether or not the computed capacity of the battery array 2 has reached the upper capacity limit or the lower capacity limit a specified number of times, or whether or not a specified time has elapsed since the last revision. If either of these conditions are satisfied, the computed capacity of the battery array 2 is revised.

Revision of the computed capacity takes place in the fourth step S4. When either of the above mentioned conditions are satisfied, forced charging of the battery array 2 is first performed in step S4 until the temperature or the rate of temperature rise of the entire battery array 2 or of at least one rechargeable battery of the battery array 2 reaches a specified value, or battery voltage reaches a specified voltage.

When either of these conditions is met, battery array 2 charging is prohibited and a predetermined capacity tolerance limit (for example, 95% of full capacity) is written into the battery array 2 computed capacity. The prohibited charging condition is maintained until battery array 2 computed capacity reaches the specified capacity (namely, 50%).

Thus, by execution of this fourth step S4, computed capacity of the battery array 2 is revised. After battery array computed capacity reaches the specified capacity, operation returns to step S2.

Figure 5:
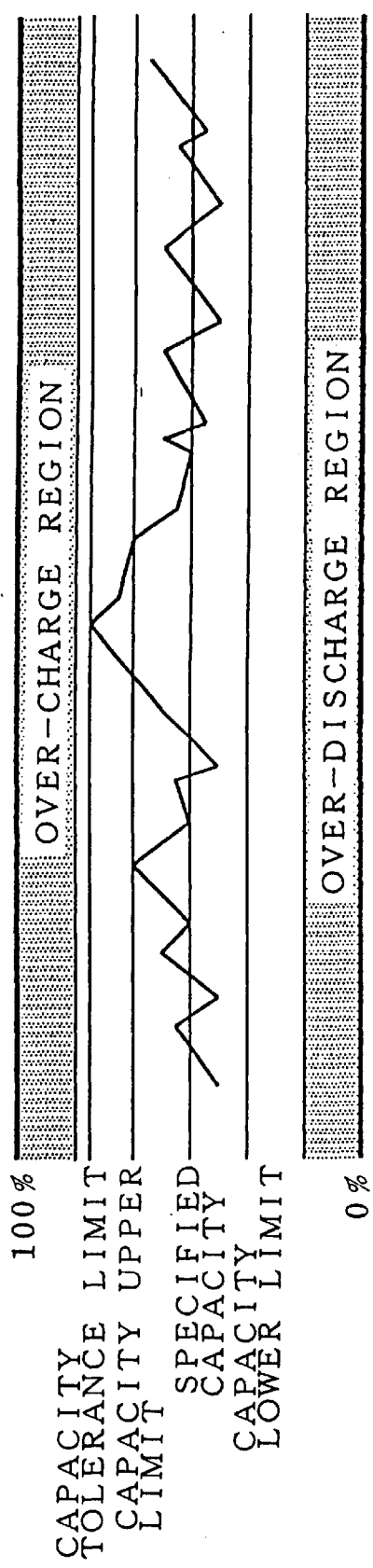
FIG. 5 is a battery capacity graph showing operation of an embodiment of the present invention.

According to operation described above, charging and discharging of the battery array 2 typically proceeds within a specified range between the upper capacity limit and the lower capacity limit and centered at the specified capacity as shown in FIG. 5. In addition, the computed capacity of the battery array 2 is periodically revised to insure charging and discharging within the specified range described above.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A method of controlling charging and discharging a battery array having a plurality of serially connected rechargeable batteries, said method comprising:

computing and integrating a charge-discharge capacity of the battery array during each of a plurality of time periods, including first and second time periods; and performing forced charging or forced discharging during the second time period to make a sum of the charge-discharge capacity computed in the first time period and the charge-discharge capacity computed in the second time period approach zero, such that a capacity of the battery array substantially maintains a specified capacity within a range between a battery array full charge capacity and a battery array complete discharge capacity.

2. A method of controlling charging and discharging as recited in claim 1, wherein said computing and integrating of the charge-discharge capacity comprises integrating a charge current or a discharge current.

3. A method of controlling charging and discharging as recited in claim 1, wherein the battery array is a power source for an electric automobile.

4. A method of controlling charging and discharging a battery array having a plurality of serially connected rechargeable batteries, said method comprising:

establishing an upper capacity limit lower than a battery array full charge capacity, a lower capacity limit greater than a battery array complete discharge capacity, and a specified capacity between the upper capacity limit and the lower capacity limit;

computing and integrating a charge-discharge capacity of the battery array during each of a plurality of time periods, including first and second time periods; and performing forced charging or forced discharging during the second time period to make a sum of the charge-discharge capacity computed in the first time period and the charge-discharge capacity computed in the second time period approach zero; and revising the charge-discharge capacity when the charge-discharge capacity reaches the upper capacity limit or the lower capacity limit more than a specified number of times, or when a specified time period has elapsed since a last revision.

5. A method of controlling charging and discharging as recited in claim 4, wherein the upper capacity limit is 55% of the battery array full charge capacity.

6. A method of controlling charging and discharging as recited in claim 4, wherein the lower capacity limit is 45% of the battery array full charge capacity.

7. A method of controlling charging and discharging as recited in claim 4, wherein the specified capacity is 50% of the battery array full charge capacity.

8. A method of controlling charging and discharging as recited in claim 4, wherein said revising of the charge-discharge capacity comprises:

charging the battery array until a temperature or a rate of temperature rise of at least one of the plurality of rechargeable batteries reaches a specified value; and after said charging, writing a capacity tolerance limit lower than the battery array full charge capacity and greater than the upper capacity limit as the charge-discharge capacity.

9. A method of controlling charging and discharging as recited in claim 8, wherein the capacity tolerance limit is 95% of the battery array full charge capacity.

10. A method of controlling charging and discharging as recited in claim 8, further comprising after said revising of the charge-discharge capacity, prohibiting charging of the battery array until the charge-discharge capacity reaches the specified capacity.

11. A method of controlling charging and discharging as recited in claim 4, wherein said revising of the charge-discharge capacity comprises:

charging the battery array until a voltage of at least one of the plurality of rechargeable batteries becomes greater than or equal to a specified voltage; and after said charging, writing a capacity tolerance limit lower than the battery array full charge capacity and greater than the upper capacity limit as the charge-discharge capacity.

12. A method of controlling charging and discharging as recited in claim 11, wherein the capacity tolerance limit is 95% of the battery array full charge capacity.

13. A method of controlling charging and discharging as recited in claim 11, further comprising after said revising of the charge-discharge capacity, prohibiting charging of the battery array until the charge-discharge capacity reaches the specified capacity.

* * * * *